(12) United States Patent
Mukasa

(10) Patent No.: US 8,861,915 B2
(45) Date of Patent: Oct. 14, 2014

(54) OPTICAL FIBER, OPTICAL TRANSMISSION SYSTEM, AND METHOD FOR MEASURING OPTICAL FIBER

(71) Applicant: Furukawa Electric Co., Ltd., Tokyo (JP)

(72) Inventor: Kazunori Mukasa, Tokyo (JP)

(73) Assignee: Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 13/889,936

(22) Filed: May 8, 2013

(65) Prior Publication Data

US 2013/0251323 A1    Sep. 26, 2013

Related U.S. Application Data

(63) Continuation of application No. PCT/JP2012/057039, filed on Mar. 19, 2012.

(30) Foreign Application Priority Data

Mar. 17, 2011    (JP) .................................. 2011-059580

(51) Int. Cl.
*G02B 6/036*    (2006.01)
*G02B 6/02*    (2006.01)

(52) U.S. Cl.
CPC ............. *G02B 6/02* (2013.01); *G02B 6/02004* (2013.01); *G02B 6/02009* (2013.01); *G02B 6/02019* (2013.01); *G02B 6/02014* (2013.01); *G02B 6/02023* (2013.01); *G02B 6/03627* (2013.01)
USPC ....................................... 385/127

(58) Field of Classification Search
CPC .. G02B 6/02; G02B 6/02004; G02B 6/02009; G02B 6/02014
USPC .......................................... 385/123, 126–127
See application file for complete search history.

(56) References Cited

FOREIGN PATENT DOCUMENTS

| JP | 49-24441 | 3/1974 |
|----|----------|--------|
| JP | 52-153453 | 12/1977 |

OTHER PUBLICATIONS

International Search Report mailed Jun. 19, 2012 for PCT/JP2012/057039 filed on Mar. 19, 2012 with English Translation.
International Written Opinion mailed Jun. 19, 2012 for PCT/JP2012/057039 filed on Mar. 19, 2012.

(Continued)

*Primary Examiner* — Ryan Lepisto
*Assistant Examiner* — Erin Chiem
(74) *Attorney, Agent, or Firm* — Oblon, Spivak, McClelland, Maier & Neustadt, L.L.P.

(57) ABSTRACT

An optical fiber includes a core portion and a cladding portion that is formed around an outer periphery of the core portion and has a refractive index lower than a maximum refractive index of the core portion. As characteristics at a wavelength of 1550 nm, an effective core area in a fundamental propagation mode is 120 $\mu m^2$ or larger, an effective core area in a first higher-order propagation mode is 150 $\mu m^2$ or larger, an effective core area in a second higher-order propagation mode is 180 $\mu m^2$ or larger. An effective refractive index in the second higher-order propagation mode is larger than the refractive index of the cladding portion by 0.0002 or more, and an effective refractive index in a third higher-order propagation mode is less than the refractive index of the cladding portion.

9 Claims, 14 Drawing Sheets

(56) References Cited

OTHER PUBLICATIONS

An Li, Abdullah Al Amin, Xi Chen and William Shieh, Reception of mode and polarization multiplexed 107-Gb/s CO-OFDM signal over a two-mode fiber, Optical Fiber Communication Conference and Exposition (OFC/NFOEC), 2011 and the National Fiber Optic Engineers Conference, Mar. 6, 2011, pp. 1-3.

Kazunori Mukasa, Katsunori Imamura, Ryuichi Sugizaki, "Optimizing 3- mode fibers for Mode-division-multiplexing Transmission", IEICE Technical Report, Oct. 13, 2011 vol. 111, No. 246, pp. 11-14. (With English Abstract).

C. Koebele, M. Salsi, G. Charlet, S. Bigo "Nonlinear Effects in Long-Haul Transmission over Bimodal Optical Fibre," ECOC2010, Mo.2.C.6. Sep. 19-23, 2010, Torino, Italy.

Bernd Franz, Detlef Suikat, Roman Dischler, Fred Buchali, Henning Buelow "High Speed OFDM Data Transmission Over 5 Km GI-Multimode Fiber Using Spatial Multiplexing With 2×4 MIMO Processing ," ECOC2010, Tu.3.C.4. Sep. 19-23, 2010, Torino Italy.

Marianne Bigot-Astruc, Frans Gooijer, Nelly Montaigne, Pierre Sillard, "Trench-Assisted Profiles for Large-Effective-Area Single-Mode Fibers," ECOC2008, Mo.4.B.1. Sep. 21-25, 2008, Brussels, Belgium.

Yoshinori Yamamoto, Masaaki Hirano, Kazuya Kuwahara, Takashi Sasaki "OSNR-Enhancing Pure-Silica-Core Fiber with Large Effective Area and Low Attenuation," OFC/NFOEC2010, OTu12.

U.S. Appl. No. 13/889,936, May 8, 2013, Mukasa.
U.S. Appl. No. 13/962,642, Aug. 8, 2013, Mukasa.
U.S. Appl. No. 13/889,936, filed May 8, 2013, Mukasa.
U.S. Appl. No. 14/157,612, filed Jan. 17, 2014, Mukasa.

FIG.7

| NUMBER | PARAMETER | | | | |
|---|---|---|---|---|---|
| | Ra2 | Δ1 | Δ2 | 2a | 2b |
| | | % | % | μm | μm |
| 1-1 | 3.0 | 0.47 | -0.10 | 15.20 | 45.60 |
| 1-2 | 4.0 | 0.46 | -0.10 | 15.00 | 60.00 |
| 1-3 | 2.0 | 0.41 | -0.10 | 16.30 | 32.60 |
| 1-4 | 3.0 | 0.39 | -0.10 | 16.50 | 49.50 |
| 1-5 | 4.0 | 0.38 | -0.10 | 16.55 | 66.20 |
| 1-6 | 4.0 | 0.42 | -0.10 | 16.20 | 64.80 |
| 2-1 | 3.0 | 0.46 | -0.05 | 14.90 | 44.70 |
| 2-2 | 3.0 | 0.39 | -0.20 | 16.80 | 50.40 |
| 2-3 | 3.0 | 0.41 | -0.05 | 16.10 | 48.30 |
| 2-4 | 3.0 | 0.36 | -0.05 | 17.20 | 51.60 |
| 3-1 | 2.0 | 0.43 | -0.50 | 17.30 | 34.60 |
| 3-2 | 2.0 | 0.43 | -0.45 | 17.20 | 34.40 |
| 3-3 | 2.0 | 0.43 | -0.40 | 17.20 | 34.40 |
| 3-4 | 2.0 | 0.43 | -0.35 | 17.10 | 34.20 |
| 3-5 | 2.0 | 0.43 | -0.30 | 17.00 | 34.00 |
| 3-6 | 2.0 | 0.43 | -0.25 | 16.80 | 33.60 |
| 3-7 | 2.0 | 0.43 | -0.20 | 16.70 | 33.40 |
| 3-8 | 2.0 | 0.43 | -0.15 | 16.50 | 33.00 |

FIG.8

| NUMBER | FUNDAMENTAL (LP01 MODE) | | | | | | LP11 MODE | | | | | |
|---|---|---|---|---|---|---|---|---|---|---|---|---|
| | CHROMATIC DISPERSION | DISPERSION SLOPE | MFD | neff | Aeff | BENDING LOSS | CHROMATIC DISPERSION | DISPERSION SLOPE | MFD | neff | Aeff | BENDING LOSS |
| | ps/nm/km | ps/nm$^2$/km | μm | | μm$^2$ | dB/m | ps/nm/km | ps/nm$^2$/km | μm | | μm$^2$ | dB/m |
| 1-1 | 21.4 | 0.0648 | 12.1 | 1.44971 | 130.9 | 2.18E-14 | 22.8 | 0.0588 | 9.8 | 1.44760 | 190.4 | 2.73E-06 |
| 1-2 | 21.4 | 0.0646 | 12.1 | 1.44957 | 131.2 | 1.66E-11 | 22.7 | 0.0586 | 9.8 | 1.44739 | 188.2 | 2.33E-06 |
| 1-3 | 21.4 | 0.0646 | 13.0 | 1.44906 | 151.4 | 6.05E-08 | 22.8 | 0.0597 | 10.4 | 1.44718 | 217.0 | 3.07E-04 |
| 1-4 | 21.5 | 0.0646 | 13.1 | 1.44878 | 154.5 | 5.68E-10 | 22.7 | 0.0597 | 10.6 | 1.44698 | 223.5 | 2.38E-04 |
| 1-5 | 21.5 | 0.0646 | 13.3 | 1.44864 | 155.9 | 4.27E-10 | 22.7 | 0.0599 | 10.8 | 1.44688 | 225.9 | 4.18E-05 |
| 1-6 | 21.4 | 0.0647 | 12.9 | 1.44918 | 150.4 | 4.16E-06 | 22.9 | 0.0601 | 10.4 | 1.44726 | 213.9 | 3.12E-06 |
| 2-1 | 21.2 | 0.0644 | 12.1 | 1.44955 | 130.2 | 5.49E-10 | 21.8 | 0.0572 | 9.9 | 1.44743 | 193.0 | 3.64E-05 |
| 2-2 | 21.7 | 0.0647 | 12.9 | 1.44877 | 152.4 | 1.65E-08 | 23.8 | 0.0611 | 10.3 | 1.44695 | 217.2 | 4.02E-04 |
| 2-3 | 21.3 | 0.0645 | 13.0 | 1.44903 | 150.2 | 6.05E-08 | 22.1 | 0.0588 | 10.6 | 1.44719 | 221.1 | 5.84E-03 |
| 2-4 | 21.3 | 0.0645 | 13.8 | 1.44846 | 170.7 | 7.52E-08 | 22.1 | 0.0596 | 11.3 | 1.44684 | 250.8 | 7.33E-02 |
| 3-1 | 22.1 | 0.0653 | 12.6 | 1.44934 | 15.03 | 7.49E-10 | 25.8 | 0.0640 | 9.8 | 1.44745 | 206.1 | 1.37E-05 |
| 3-2 | 22.0 | 0.0653 | 12.6 | 1.44934 | 150.0 | 1.69E-11 | 25.6 | 0.0637 | 9.8 | 1.44744 | 206.2 | 2.32E-05 |
| 3-3 | 22.0 | 0.0652 | 12.7 | 1.44935 | 151.4 | 4.88E-12 | 25.3 | 0.0635 | 9.9 | 1.44747 | 208.5 | 3.07E-05 |
| 3-4 | 21.9 | 0.0652 | 12.7 | 1.44935 | 151.3 | 1.66E-13 | 25.1 | 0.0631 | 9.9 | 1.44747 | 209.1 | 5.12E-05 |
| 3-5 | 21.8 | 0.0651 | 12.8 | 1.44935 | 151.5 | 5.45E-10 | 24.8 | 0.0627 | 10.0 | 1.44747 | 210.1 | 8.46E-05 |
| 3-6 | 21.7 | 0.0650 | 12.8 | 1.44933 | 150.3 | 5.38E-13 | 24.4 | 0.0621 | 10.0 | 1.44745 | 209.6 | 5.99E-06 |
| 3-7 | 21.6 | 0.0649 | 12.8 | 1.44934 | 150.9 | 3.48E-12 | 24.0 | 0.0616 | 10.1 | 1.44746 | 211.6 | 9.19E-06 |
| 3-8 | 21.5 | 0.0648 | 12.8 | 1.44933 | 150.3 | 1.43E-12 | 23.6 | 0.0609 | 10.2 | 1.44745 | 212.5 | 1.79E-05 |

FIG.9

| NUM-BER | LP21 MODE | | | | | | Δn | LP02 |
|---|---|---|---|---|---|---|---|---|
| | CHROMATIC DISPERSION | DISPERSION SLOPE | MFD | neff | Aeff | BENDING LOSS | | neff |
| | ps/nm/km | ps/nm²/km | μm | | μm² | dB/m | | |
| 1-1 | 17.0 | 0.0207 | 18.6 | 1.44495 | 223.5 | 1.08E+01 | 0.0006 | 1.44424 |
| 1-2 | 15.3 | 0.0144 | 18.6 | 1.44472 | 224.6 | 5.85E+00 | 0.0003 | 1.44403 |
| 1-3 | 16.5 | -0.0024 | 19.9 | 1.44486 | 254.2 | 1.64E+02 | 0.0005 | 1.44424 |
| 1-4 | 18.0 | 0.0277 | 20.1 | 1.44472 | 261.1 | 1.72E+01 | 0.0003 | 1.44411 |
| 1-5 | 17.7 | 0.0281 | 20.3 | 1.44463 | 265.3 | 1.53E+01 | 0.0002 | 1.44403 |
| 1-6 | 18.6 | 0.0308 | 19.6 | 1.44492 | 248.1 | 2.25E+00 | 0.0005 | 1.44427 |
| 2-1 | 10.2 | -0.0194 | 19.4 | 1.44483 | 242.4 | 1.39E+02 | 0.0004 | 1.44424 |
| 2-2 | 22.8 | 0.0439 | 19.3 | 1.44463 | 240.7 | 4.10E-01 | 0.0002 | 1.44393 |
| 2-3 | 14.2 | 0.0101 | 20.5 | 1.44491 | 269.8 | 1.10E+02 | 0.0005 | 1.44435 |
| 2-4 | 15.7 | 0.0196 | 21.7 | 1.44483 | 303.6 | 1.54E+02 | 0.0004 | 1.44432 |
| 3-1 | 29.2 | 0.0577 | 18.4 | 1.44501 | 216.6 | 4.18E-01 | 0.0006 | 1.44420 |
| 3-2 | 28.6 | 0.0562 | 18.5 | 1.44501 | 217.6 | 7.57E-01 | 0.0006 | 1.44420 |
| 3-3 | 27.9 | 0.0550 | 18.6 | 1.44506 | 220.9 | 1.19E+00 | 0.0007 | 1.44427 |
| 3-4 | 27.1 | 0.0530 | 18.7 | 1.44506 | 222.9 | 2.21E+00 | 0.0007 | 1.44428 |
| 3-5 | 26.1 | 0.0503 | 18.8 | 1.44508 | 225.6 | 4.17E+00 | 0.0007 | 1.44431 |
| 3-6 | 24.8 | 0.0456 | 18.9 | 1.44505 | 227.6 | 9.22E+00 | 0.0007 | 1.44429 |
| 3-7 | 23.3 | 0.0405 | 19.1 | 1.44508 | 232.7 | 1.79E+01 | 0.0007 | 1.44435 |
| 3-8 | 21.2 | 0.0312 | 19.3 | 1.44507 | 238.3 | 4.07E+01 | 0.0007 | 1.44438 |

FIG.12

| Δ1 | Δ2 | 2a | 2b | Ra2 |
|---|---|---|---|---|
| % | % | μm | μm |  |
| 0.43 | -0.45 | 17 | 37 | 2.18 |

FIG.13

| MODE | CHRO-MATIC DISPER-SION | DISPER-SION SLOPE | Aeff | neff | BENDING LOSS | |
|---|---|---|---|---|---|---|
|  |  |  |  |  | BENDING DIAMETER 20mm | BENDING DIAMETER 160mm |
|  | ps/nm /mm | ps/nm$^2$ /mm | μm$^2$ |  | dB/m | dB/m |
| LP01 | 22.1 | 0.0653 | 145.8 | 1.44930 | 6.76E-14 | 5.15E-22 |
| LP11 | 25.6 | 0.0635 | 201.8 | 1.44738 | 1.39E-05 | 4.60E-17 |
| LP21 | 28.5 | 0.0559 | 213.8 | 1.44490 | 2.38E-01 | 8.10E-05 |
| LP02 | 26.9 | 0.0417 | 124.0 | 1.44408 | 1.54E+00 | 7.65E-01 |

| MEASUREMENT ITEMS | | | UNIT | OFFSET | | |
|---|---|---|---|---|---|---|
| | | | | 0 μm | 5 μm | 9 μm |
| TRANSMISSION LOSS | WAVE-LENGTH | 1.55 μm | dB/km | 0.395 | 0.487 | 1.058 |
| | | 1.31 μm | | 0.210 | 0.402 | 0.579 |
| BENDING LOSS @1.55 μm | BENDING DIAM-ETER | 10mm | dB/m | 1.22 | 2.82 | 4.42 |
| | | 20mm | | 0.07 | 0.90 | 2.32 |
| Aeff | WAVE-LENGTH | 1.55 μm | μm² | 151.0 | 220.2 | 277.7 |
| | | 1.31 μm | | 152.1 | 192.2 | 196.9 |
| PMD @1.55 μm | | | ps/rkm | 0.696 | 0.884 | 1.224 |
| CHROMATIC DISPERSION @1.55 μm | | | ps/nm/km | 22.2 | 22.1 | 24.0 |

OPTICAL FIBER, OPTICAL TRANSMISSION SYSTEM, AND METHOD FOR MEASURING OPTICAL FIBER

CROSS-REFERENCE TO RELATED APPLICATIONS

This application is a continuation of PCT International Application No. PCT/JP2012/057039 filed on Mar. 19, 2012 which claims the benefit of priority from Japanese Patent Application No. 2011-059580 filed on Mar. 17, 2011, the entire contents of which are incorporated herein by reference.

BACKGROUND

1. Technical Field

The disclosure relates to an optical fiber, an optical transmission system, and a method for measuring the optical fiber.

2. Related Art

Along with the dramatic increase of the Internet traffic in recent years, there has been predicted the lack of prospective transmission capacity. As a method to overcome this situation, in addition to a fundamental propagation mode of an optical fiber used conventionally, there has been disclosed a mode division multiplexing transmission technique in which a higher-order propagation mode is used for optical transmission (see C. Koebele, M. Salsi, G. Charlet, S. Bigo "Nonlinear Effects in Long-Haul Transmission over Bimodal Optical Fiber," ECOC2010, Mo.2.C.6; and Bernd Franz, Detlef Suikat, Roman Dischler, Fred Buchali, Henning Buelow "High Speed OFDM Data Transmission Over 5 km GI-Multimode Fiber Using Spatial Multiplexing With 2×4 MIMO Processing," ECOC2010, Tu.3.C.4). Furthermore, it is important for higher quality optical transmission to enlarge an effective core area (Aeff) of the optical fiber so as to suppress the occurrence of nonlinear optical phenomena in the optical fiber (see Marianne Bigot-Astruc, Frans Gooijer, Nelly Montaigne, Pierre Sillard, "Trench-Assisted Profiles for Large-Effective-Area Single-Mode Fibers," ECOC2008, Mo.4.B.1; and Yoshinori Yamamoto, Masaaki Hirano, Kazuya Kuwahara, Takashi Sasaki "OSNR-Enhancing Pure-Silica-Core Fiber with Large Effective Area and Low Attenuation," OFC/NFOEC2010, OTuI2).

However, when the effective core area of the optical fiber is enlarged, a bending loss becomes large. Particularly, when the fundamental and higher-order propagation modes of the optical fiber are used for optical transmission, the above-described bending loss occurs with respect to each propagation mode.

Accordingly, there is a need to provide an optical fiber, an optical transmission system, and a method for measuring the optical fiber in which even when the fundamental and higher-order propagation modes of the optical fiber are used for the optical transmission, the effective core area is large and the bending loss is small in each propagation mode.

SUMMARY

In accordance with some embodiments, an optical fiber, an optical transmission system, and a method for measuring the optical fiber are presented.

In some embodiments, an optical fiber includes a core portion and a cladding portion that is formed around an outer periphery of the core portion and has a refractive index lower than a maximum refractive index of the core portion. As characteristics of the optical fiber at a wavelength of 1550 nm, an effective core area in a fundamental propagation mode is 120 $\mu m^2$ or larger, an effective core area in a first higher-order propagation mode is 150 $\mu m^2$ or larger, an effective core area in a second higher-order propagation mode is 180 $\mu m^2$ or larger, an effective refractive index in the second higher-order propagation mode is larger than the refractive index of the cladding portion by 0.0002 or more, and an effective refractive index in a third higher-order propagation mode is less than the refractive index of the cladding portion.

In some embodiments, an optical transmission system includes the optical fiber.

In some embodiments, a method for measuring an optical fiber includes: connecting a launching optical fiber in which measuring light having a predetermined wavelength propagates in a single mode to one end portion of an optical fiber to be measured in which the measuring light propagates in a multi-mode such that a center axis of a core portion of the optical fiber to be measured and a center axis of a core portion of the launching optical fiber are displaced to each other by a predetermined offset; and measuring characteristics of the measuring light that is input from the launching optical fiber to the optical fiber to be measured to propagate therein and output from the other end portion of the optical fiber to be measured. The offset is set such that the measuring light propagates in a predetermined propagation mode in the optical fiber to be measured.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a table of design parameters of optical fibers according to calculation examples 1-1 to 1-6, 2-1 to 2-4, and 3-1 to 3-8;

FIG. 8 is a table of optical characteristics in the fundamental mode (LP01 mode) and the LP11 mode of the optical fibers according to the calculation examples 1-1 to 1-6, 2-1 to 2-4, and 3-1 to 3-8;

FIG. 9 is a table of optical characteristics in the LP21 mode and effective refractive indexes in the LP02 mode of the optical fibers according to the calculation examples 1-1 to 1-6, 2-1 to 2-4, and 3-1 to 3-8;

FIG. 12 is a table of measured values of design parameters of the optical fiber in an example 1;

FIG. 13 is a table of calculated values of optical characteristics in each propagation mode of the optical fiber in the example 1;

DETAILED DESCRIPTION

Exemplary embodiments of an optical fiber according to the present invention will be explained in detail below with reference to the accompanying drawings. It is noted that the present invention is not limited to the following embodiments. Furthermore, a bending loss indicates a macrobending loss when the optical fiber is bent at a predetermined diameter (a bending diameter). Unless otherwise specified, the terms herein follow the definition and measuring methods according to ITU-T (International telecommunication Union) G.650.1.

First Embodiment

Figure 1:
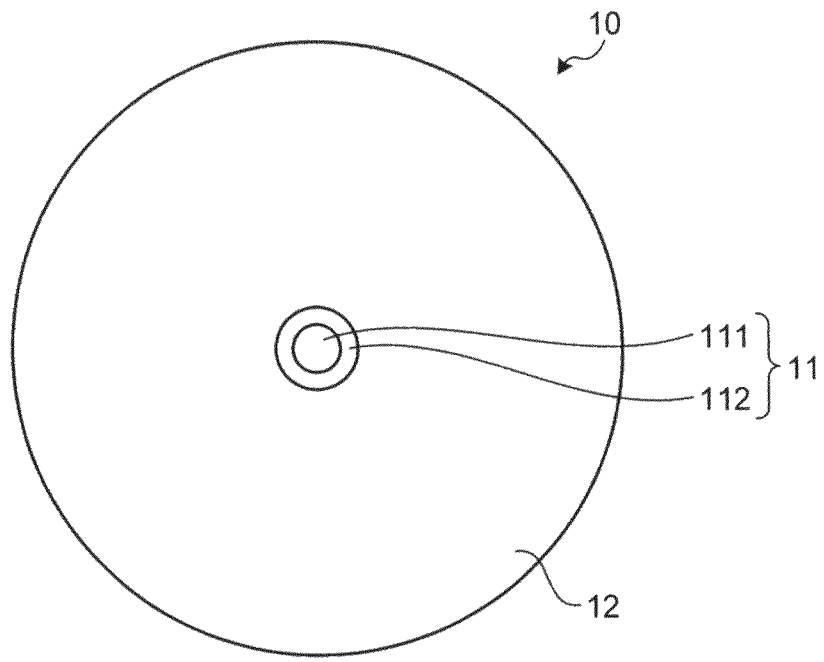
FIG. 1 is a schematic cross-sectional view of an optical fiber according to a first embodiment.

FIG. 1 is a schematic cross-sectional view of an optical fiber according to a first embodiment of the present invention. As illustrated in FIG. 1, the optical fiber 10 includes a core portion 11 positioned at the center thereof and a cladding portion 12 formed around an outer periphery of the core portion 11.

The core portion 11 includes a center core portion 111 and an outer core portion 112 formed around an outer periphery of the center core portion 111. The center core portion 111 is made of silica glass containing dopant such as germanium (Ge) for increasing a refractive index. The outer core portion 112 is made of silica glass containing dopant such as fluorine (F) for decreasing the refractive index. The cladding portion 12 is made of pure silica glass. As a result, the center core portion 111 has a maximum refractive index in the core portion 11 and is higher in refractive index than the cladding portion 12. Furthermore, the outer core portion 112 is lower in refractive index than the cladding portion 12.

Figure 2:
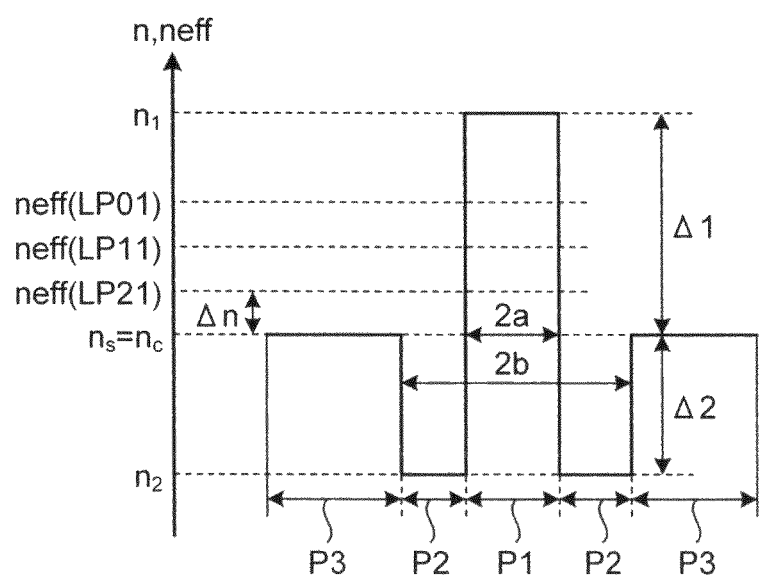
FIG. 2 is a diagram of a refractive index distribution of the optical fiber illustrated in FIG. 1.

FIG. 2 is a diagram of the refractive index distribution of the optical fiber 10 illustrated in FIG. 1. In FIG. 2, a region P1 indicates the refractive index distribution of the center core portion 111. A region P2 indicates the refractive index distribution of the outer core portion 112. A region P3 indicates the refractive index distribution of the cladding portion 12. In this manner, the optical fiber 10 has a so-called W-shaped refractive index distribution such that the refractive index of the outer core portion 112 is lower than the refractive index of the cladding portion 12.

Here, as illustrated in FIG. 2, the relative refractive-index difference of the center core portion 111 relative to the cladding portion 12 is denoted by Δ1, and the relative refractive-index difference of the outer core portion 112 relative to the cladding portion 12 is denoted by Δ2. The relative refractive-index differences Δ1 and Δ2 are defined by the following expressions (1) and (2):

$$\Delta 1 = \{(n_1 - n_c)/n_c\} \times 100 [\%] \quad (1)$$

$$\Delta 2 = \{(n_2 - n_c)/n_c\} \times 100 [\%] \quad (2)$$

Here, $n_1$ indicates the maximum refractive index of the center core portion 111, $n_2$ indicates the refractive index of the outer core portion 112, and $n_c$ indicates the refractive index of the cladding portion 12. In the present first embodiment, since the cladding portion 12 is made of pure silica glass, $n_c$ is equal to the refractive index $n_s$ of the silica glass (1.44439 at a wavelength of 1550 nm).

Furthermore, as illustrated in FIG. 2, the diameter of the center core portion 111 is denoted by 2a, and the outside diameter of the outer core portion 112 is denoted by 2b. Furthermore, b/a that is a ratio of the outer core portion outside diameter 2b to the center core portion diameter 2a is denoted by Ra2. Here, the center core portion diameter 2a is a diameter at a position at which the relative refractive-index difference Δ1 becomes 0% on the boundary between the center core portion 111 and the outer core portion 112. In addition, the outer core portion outside diameter 2b is a diameter at a position at which a relative refractive-index difference becomes one-half of the relative refractive-index difference Δ2 on the boundary between the outer core portion 112 and the cladding portion 12.

Here, as illustrated in FIG. 2, an effective refractive index in an LP01 mode that is a fundamental propagation mode of the optical fiber 10 according to the present first embodiment is $n_{eff}$(LP01), an effective refractive index in an LP11 mode that is a first higher-order propagation mode is $n_{eff}$(LP11), and an effective refractive index in an LP21 mode that is a second higher-order propagation mode is $n_{eff}$(LP21). In the optical fiber 10, when the difference between $n_{eff}$(LP21) and the refractive index $n_c$ of the cladding portion 12 is Δn, Δn becomes 0.0002 or more.

In this manner, in the optical fiber 10, the effective refractive index $n_{eff}$(LP21) in the LP21 mode that is the second higher-order propagation mode is set to a value larger than the refractive index $n_c$ of the cladding portion 12 by 0.0002 or more. Due to such a constitution, in the optical fiber 10, as characteristics at a wavelength of 1550 nm, an effective core area in the LP01 mode is as large as a value of 120 μm² or larger, an effective core area in the LP11 mode is as large as a value of 150 μm² or larger, an effective core area in the LP21 mode is as large as a value of 180 μm² or larger, and the bending loss in the LP01 mode, the LP11 mode or the LP21 mode becomes small.

Here, in order to set $n_{eff}$(LP21) larger than $n_c$ by 0.0002 or more, for example, Δ1 may be set to 0.42%, Δ2 may be set to −0.10%, and 2a and 2b may be set to 16.20 μm and 64.80 μm respectively (that is, Ra2 may be set to 4.0). When the design parameters of the optical fiber 10 are set in this manner, $n_{eff}$(LP21) becomes 1.44492, and becomes larger than $n_c$ by 0.0005. In this case, as characteristics at a wavelength of 1550 nm, the effective core area and the bending loss in the LP01 mode become 150.4 μm² and 4.16×10⁻⁸ dB/m, respectively, the effective core area and the bending loss in the LP11 mode become 213.9 μm² and 3.12Δ10⁻⁶ dB/m respectively, and the effective core area and the bending loss in the LP21 mode become 248.1 μm² and 2.25 dB/m, respectively thus obtaining desired characteristics. Here, the bending loss occurs when the bending diameter is 20 mm.

Furthermore, when the design parameters of the optical fiber 10 are set as described above, the effective refractive index $n_{eff}$(LP02) at a wavelength of 1550 nm in the LP02 mode that is a third higher-order mode is 1.44427 that is smaller than the refractive index of silica glass (1.44439). As a result, in the optical fiber 10, the LP02 mode becomes a leaky mode at a wavelength of 1550 nm, and only three modes; that is the LP01 mode, the LP11 mode, and the LP21 mode become propagation modes.

Figure 3A:
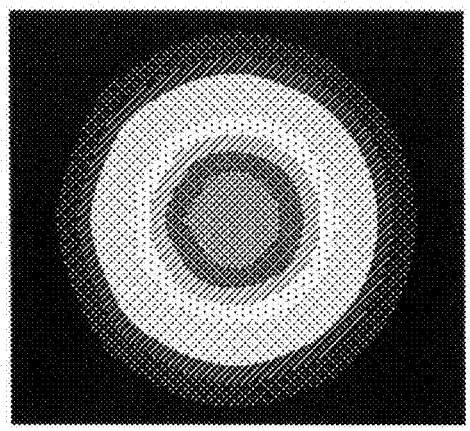
FIG. 3A is a diagram of a field distribution (intensity distribution of an Ex component of an electric field) in a fundamental mode (LP01 mode) of the optical fiber illustrated in FIG. 1.
Figure 3B:
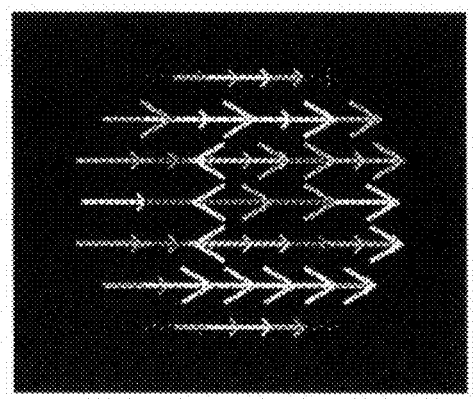
FIG. 3B is a diagram of a field distribution (vector electric field distribution) in the fundamental mode (LP01 mode) of the optical fiber illustrated in FIG. 1.
Figure 4A:
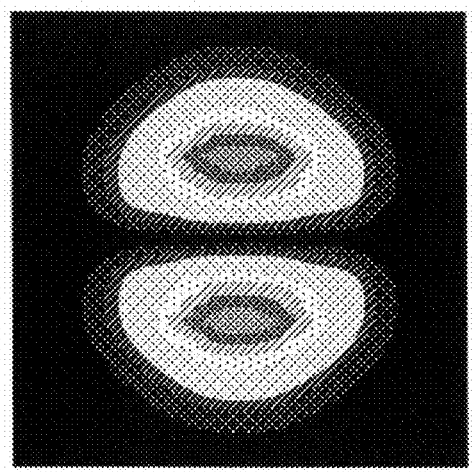
FIG. 4A is a diagram of a field distribution (intensity distribution of an Ex component of an electric field) in a first higher-order mode (LP11 mode) of the optical fiber illustrated in FIG. 1.
Figure 4B:
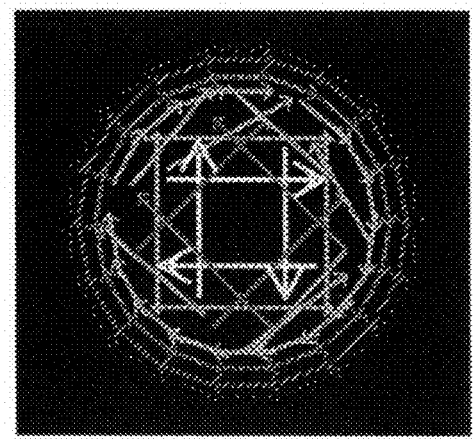
FIG. 4B is a diagram of a field distribution (vector electric field distribution) in the first higher-order mode (LP11 mode) of the optical fiber illustrated in FIG. 1.
Figure 5A:
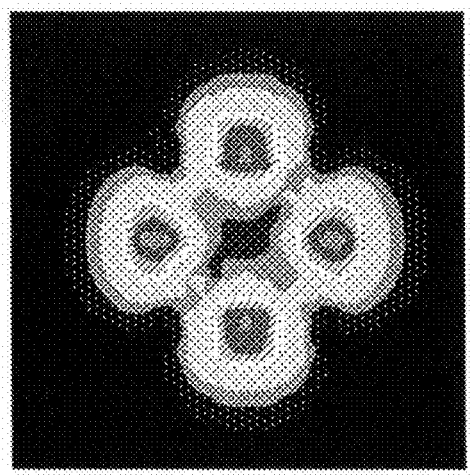
FIG. 5A is a diagram of a field distribution (intensity distribution of an Ex component of an electric field) in a second higher-order mode (LP21 mode) of the optical fiber illustrated in FIG. 1.
Figure 5B:
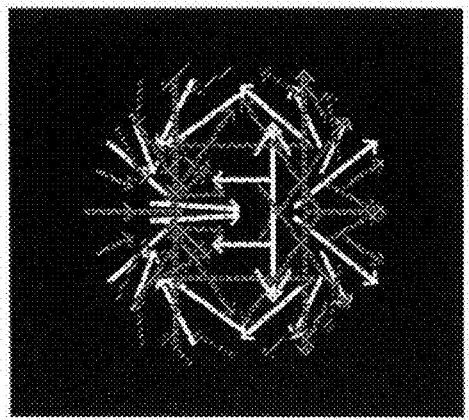
FIG. 5B is a diagram of a field distribution (vector electric field distribution) in the second higher-order mode (LP21 mode) of the optical fiber illustrated in FIG. 1.
Figure 6A:
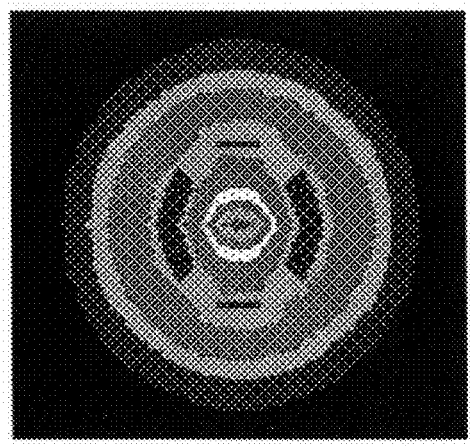
FIG. 6A is a diagram of a field distribution (intensity distribution of an Ex component of an electric field) in a third higher-order mode (LP02 mode) of the optical fiber illustrated in FIG. 1.
Figure 6B:
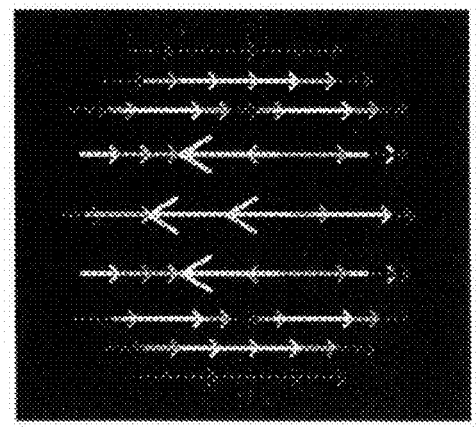
FIG. 6B is a diagram of a field distribution (vector electric field distribution) in the third higher-order mode (LP02 mode) of the optical fiber illustrated in FIG. 1.

Here, FIGS. 3A and 3B are diagrams each illustrating a field distribution in the fundamental mode (the LP01 mode) of the optical fiber 10. FIGS. 4A and 4B are diagrams each illustrating a field distribution in the first higher-order mode (the LP11 mode) of the optical fiber 10. FIGS. 5A and 5B are diagrams each illustrating a field distribution in the second higher-order mode (the LP21 mode) of the optical fiber 10. FIGS. 6A and 6B are diagrams each illustrating a field distribution in the third higher-order mode (the LP02 mode) of the optical fiber 10. For example, FIG. 3A illustrates the intensity distribution of the Ex component of an electric field, and FIG. 3B illustrates a vector electric field distribution. The other FIGS. 4A and 4B to FIGS. 6A and 6B also illustrate in the same manner as above.

As illustrated in FIGS. 3A and 3B, the LP01 mode has a high-intensity field distribution at the center. That is, the field distribution has a Gaussian shape. Furthermore, as illustrated in FIGS. 4A, 4B, 5A, and 5B, each of the LP11 mode and the LP21 mode has no field distribution in the center of the optical fiber 10, and has a high-intensity field distribution in the periphery of the center. However, in the LP11 mode and in the LP21 mode, the shapes of the field distributions are different to each other. Therefore, interference between the LP01 mode, the LP11 mode and the LP21 mode is suppressed. On the other hand, as illustrated in FIGS. 6A and 6B, in the LP02 mode, the intensity of field is high both in the center and the periphery thereof and hence, there exists a possibility that the LP02 mode interferes with all the other modes; that is, the LP01 mode, the LP11 mode, and the LP21 mode. Furthermore, even when the propagation of four modes in the optical fiber is made, it is difficult to take out only the LP02 mode selectively.

In contrast, in the optical fiber 10 of the present first embodiment, since only three modes; that is, the LP01 mode, the LP11 mode, and the LP21 mode can be propagated and the LP02 mode cannot be propagated, it is preferable that the interference between propagation modes be uncomplicated. Therefore, when three signal light beams are incident on the optical fiber 10, if the three signal light beams are incident on the optical fiber 10 in such a manner that each of the three signal light beams propagates in each of the three propagation modes, it is possible to perform the optical transmission in the three modes with less interference therebetween. Furthermore, two modes; that is, the LP11 mode and the LP21 mode may be considered as one mode group.

As explained heretofore, the optical fiber 10 according to the present first embodiment is large in effective core area and small in bending loss in the LP01 mode, the LP11 mode, and the Lp21 mode and is extremely small in interference between the respective propagation modes.

Next, in reference to calculation results using a simulation by a finite element method, the preferable design of the optical fiber according to the present first embodiment is more specifically explained.

FIG. 7 is a table of the design parameters of optical fibers according to calculation examples 1-1 to 1-6, 2-1 to 2-4, and 3-1 to 3-8. FIG. 8 is a table of optical characteristics in the fundamental mode (the LP01 mode) and the LP11 mode of the optical fibers according to the calculation examples 1-1 to 1-6, 2-1 to 2-4, and 3-1 to 3-8. FIG. 9 is a table of optical characteristics in the LP21 mode and effective refractive indexes in the LP02 mode of the optical fibers according to the calculation examples 1-1 to 1-6, 2-1 to 2-4, and 3-1 to 3-8.

The calculation examples 1-1 to 1-6 indicate results of calculation by setting Δ2 to -1.0% fixedly and changing Ra2 and Δ1. The calculation examples 2-1 to 2-4 indicate results of calculation by setting Ra2 to 3.0% fixedly and changing Δ1 and Δ2. The calculation examples 3-1 to 3-8 indicate results of calculation by fixedly setting Ra2 and Δ1 to 2.0 and 0.43% respectively, and by changing Δ2.

In FIG. 8 and FIG. 9, "MFD" is a mode field diameter, "$n_{eff}$" is the effective refraction index, "Δn" is a difference between $n_{eff}$ in the LP21 mode and the refraction index $n_c$ of the cladding portion, and "Aeff" is the effective core area. Furthermore, in the values of the bending losses or the like, "E" is a symbol indicating powers of ten and, for example, "2.73E-06" indicates "2.73×10⁻⁶". In addition, each of optical characteristics indicates a value at a wavelength of 1550 nm.

As illustrated in FIG. 7 to FIG. 9, in the optical fiber, when the relative refractive-index difference Δ1 is 0.36% or more, the relative refractive-index difference Δ2 is −0.05% or less, the center core portion diameter 2a is from 14.90 μm to 17.30 μm, and the ratio Ra2 is 2.0 or more, $n_{eff}$ in the LP21 mode is larger than the refractive index $n_c$ (=1.44439) of the cladding portion by 0.0002 or more. As a result, it is possible to realize an optical fiber in which the effective core area in the LP01 mode is 120 μm² or larger, the effective core area in the LP11 mode is 150 μm² or larger, the effective core area in the LP21 mode is 180 μm² or larger, and the bending loss in each propagation mode is small. Here, with respect to the bending loss, it is more preferable to select the combination of design parameters such that the bending loss in the LP01 mode is 1 dB/m or less, and/or the bending loss in the LP11 mode is 10 dB/m or less, and/or the bending loss in the LP21 mode is 200 dB/m or less.

Furthermore, as illustrated in the calculation examples 1-1, 1-6, 2-3, and 3-1 to 3-8, when the relative refraction index difference Δ1 is 0.41% or more, $n_{eff}$ in the LP21 mode can be made larger than $n_c$ of the cladding portion by 0.0005 or more. Due to such a constitution, the LP21 mode is tightly confined in the core portion of the optical fiber and hence, it is more preferable that the bending loss can be smaller. In addition, when Δ1 is 0.48% or less, $n_{eff}$ in the LP02 mode can be made smaller than $n_c$ of the cladding portion. When $n_{eff}$ in the LP02 mode becomes smaller than $n_c$, a leakage loss is drastically increased. Due to such a constitution, it is possible to suppress the propagation of light in the LP02 mode in the optical fiber more reliably and hence, it is preferable to realize the optical transmission in the three modes more reliably.

Figure 10:
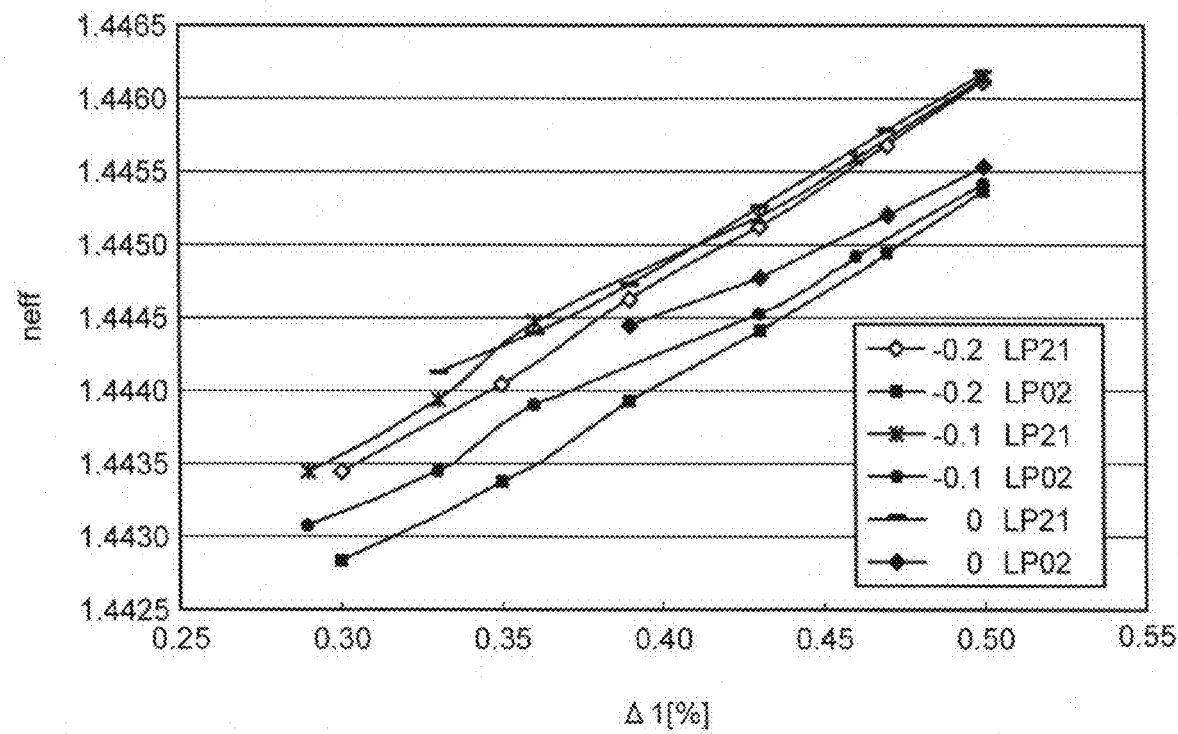
FIG. 10 is a graph of a relationship between Δ1 and the effective refractive indexes in the LP21 mode and the LP02 mode when a value of Δ2 is changed.

Next, an influence of the relative refractive-index difference Δ2 of an optical fiber upon the LP21 mode and the LP01 mode is explained. FIG. 10 is a graph of a relationship between the relative refractive-index difference Δ1 and the effective refractive indexes $n_{eff}$ in the LP21 mode and the LP02 mode when the value of the relative refractive-index difference Δ2 is changed. The relative refractive-index difference Δ2 is set to −0.2%, −0.1%, or 0%. With respect to the other design parameters, Ra2 is fixedly set to 3.0, 2a is set to any value from 13.2 μm to 17.0 μm, 2b is set to any value from 39.6 μm to 51.0 μm, and Δ1 is set to any value from 0.29% to 0.51%. In introductory notes in FIG. 10, for example, "−0.2 LP21" indicates the LP21 mode when Δ2 is −0.2%.

As illustrated in FIG. 10, in any propagation mode or any Δ2, $n_{eff}$ becomes large along with the increase of Δ1. Furthermore, when the difference between $n_{eff}$ in the LP21 mode and $n_{eff}$ in the LP02 mode in the case of the same Δ2 is compared with others, the difference becomes large along with the decrease of Δ2.

Figure 11:
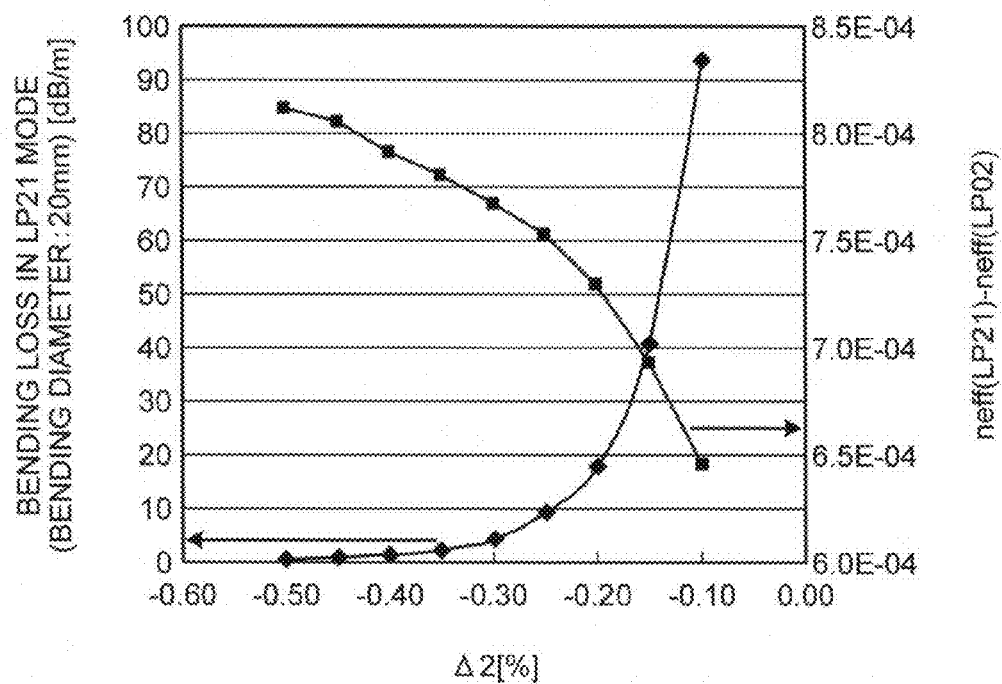
FIG. 11 is a graph of a relationship between Δ2 and a difference between the effective refractive index in the LP21 mode and the effective refractive index in the LP02 mode, and a relationship between Δ2 and a bending loss in the LP21 mode.

FIG. 11 is a graph of a relationship between Δ2 and a difference ($n_{eff}$(LP21)−$n_{eff}$(LP02)) between the effective refractive index in the LP21 mode and the effective refractive index in the LP02 mode, and a relationship between Δ2 and the bending loss in the LP21 mode. Here, with respect to the other design parameters, Ra2 is set to 2.0, Δ1 is fixedly set to 0.43%, 2a is set to any value from 16.3 μm to 17.3 μm, and 2b is set to any value from 32.6 μm to 34.6 μm.

As illustrated in FIG. 11, $n_{eff}$(LP21)−$n_{eff}$(LP02) becomes large along with the decrease of Δ2. When $n_{eff}$(LP21)−$n_{eff}$(LP02) is larger, it is possible to easily realize that light in the LP21 mode is tightly confined and propagates in the core portion of the optical fiber and light in the LP02 mode is leaked, and the allowable ranges of the other design parameters for realizing above become large. Furthermore, with respect to the bending loss in the LP21 mode also, the confinement of light is enhanced along with the decrease of Δ2 thus decreasing the bending loss.

Therefore, it is preferable that Δ2 be decreased. However, when Δ2 is decreased, there exists a possibility that the transmission loss is increased and effects obtained by decreasing Δ2 are saturated and hence, in consideration of above, it is preferable to set Δ2 to an appropriate value.

As described above, although the influence of the relative refractive-index difference Δ2 of the optical fiber upon the LP21 mode and the LP01 mode is explained, the same explanation is applied to Ra2. That is, $n_{eff}$(LP21)−$n_{eff}$(LP02) becomes large along with the increase of Ra2. As a result, it is possible to easily realize that light in the LP21 mode is tightly confined and propagates in the core portion of the optical fiber and light in the LP02 mode is leaked, and the allowable ranges of the other design parameters for realizing above become large. Furthermore, with respect to the bending loss in the LP21 mode also, the confinement of light is enhanced along with the increase of Ra2 thus decreasing the bending loss. However, when Ra2 is increased, there exists a possibility that the transmission loss is increased and effects obtained by increasing Ra2 are saturated and hence, in consideration of above, it is preferable to set Ra2 to an appropriate value.

Next, as an example 1 of the present invention, an optical fiber according to the first embodiment was manufactured using the design parameters of the calculation example 3-2 in FIG. 7 as design values. FIG. 12 is a table of measured values of the design parameters of the optical fiber manufactured in the example 1. As illustrated in FIG. 12, the optical fiber of the example 1 had design parameters almost as designed.

Next, with the use of the measured values of the design parameters illustrated in FIG. 12, the characteristics in each propagation mode of the optical fiber of the example 1 were calculated. FIG. 13 is a table of calculated values of optical characteristics in each propagation mode of the optical fiber in the example 1. As illustrated in FIG. 13, with respect to the LP01 mode, the LP11 mode, and the LP21 mode, the effective refractive index $n_{eff}$ therein was larger than the refractive index $n_c$ (1.44439 at a wavelength of 1550 nm) of the cladding portion. On the other hand, the effective refractive index $n_{eff}$ in the LP02 mode was smaller than the refractive index $n_c$ of the cladding portion. As a result, it is presumed that an optical loss caused by leakage in the LP01 mode, the LP11 mode, or the LP21 mode is extremely small. Furthermore, it is presumed that an optical loss caused by leakage in the LP02 mode is extremely large compared with the case of the other three modes. In addition, in the LP01 mode, the LP11 mode, and the LP21 mode, it was confirmed that the bending loss was extremely small.

Next, in order to measure the optical characteristics of the optical fiber of the example 1, light is input to the optical fiber of the example 1 to measure the characteristics of the light output after propagation.

Figures 14, 15:
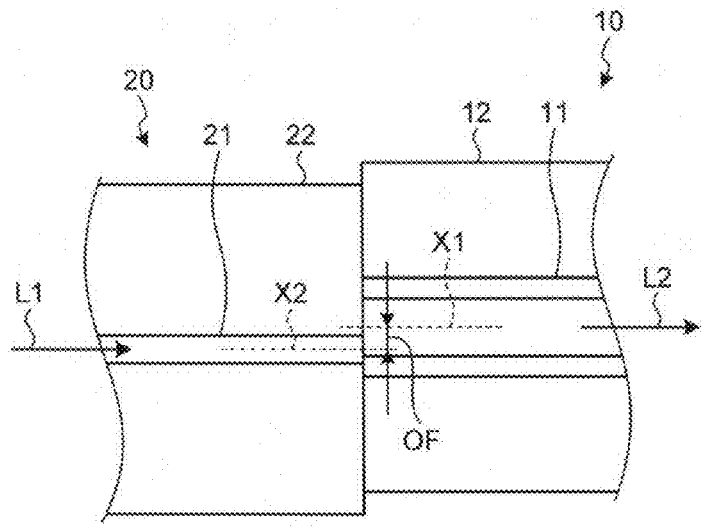
FIG. 14 is a diagram for explaining a method for measuring the optical characteristics of the optical fiber.
FIG. 15 is a table of results of the measurement of the optical characteristics of the optical fiber in the example 1.

FIG. 14 is a diagram for explaining a method of measuring the optical characteristics of an optical fiber. In this measurement method, a launching optical fiber 20 that transmits measuring light in a single mode is connected to one end portion of the optical fiber 10 which is an optical fiber to be measured. In the optical fiber 10, the measuring light having a predetermined wavelength propagates in a multi-mode. The launching optical fiber 20 includes a core portion 21 and a cladding portion 22. When connecting the launching optical fiber 20 to the optical fiber 10, the center axis X1 of the core portion 11 of the optical fiber 10 and the center axis X2 of the core portion 21 of the launching optical fiber 20 are displaced to each other by an offset OF. Next, a light source is connected to the other end portion of the launching optical fiber 20. Furthermore, a measuring device for measuring desired optical characteristics is connected to the other end portion of the optical fiber 10. In this state, the measuring light L1 output from the light source is input from the launching optical fiber 20 to the optical fiber 10. In addition, a measuring light L2 output after propagation in the optical fiber 10 is measured by the measuring device.

In this case, when the offset OF is set to zero, in the optical fiber 10, the LP01 mode having a field distribution on the center axis X1 is mainly excited. When the offset OF is set to a predetermined value, in the optical fiber 10, the LP11 mode and the LP21 mode having the field distribution in the vicinity of the center axis X1 are mainly excited. Furthermore, when the offset OF is set to a value in the middle of the range from zero to the predetermined value, in the optical fiber 10, the LP01 mode, the LP11 mode, and the LP21 mode are excited. In this manner, the offset OF is appropriately set thus exciting a desired propagation mode of the optical fiber 10 to propagate the light in the propagation mode. As a result, it is possible to measure the optical characteristics in the desired propagation mode.

Here, with respect to the launching optical fiber 20, it is preferable that the mode field diameter of the launching optical fiber 20 be one-half or less of the mode field diameter in the fundamental propagation mode (the LP01 mode) of the optical fiber 10 that is an optical fiber to be measured whereby the fundamental propagation mode and the higher-order propagation mode are easily excited separately. It is preferable that the mode field diameter of the launching optical fiber 20 be, for example, 4 µm or smaller. As such an optical fiber being small in mode field diameter, well-known highly-nonlinear optical fibers can be used.

Figure 16:
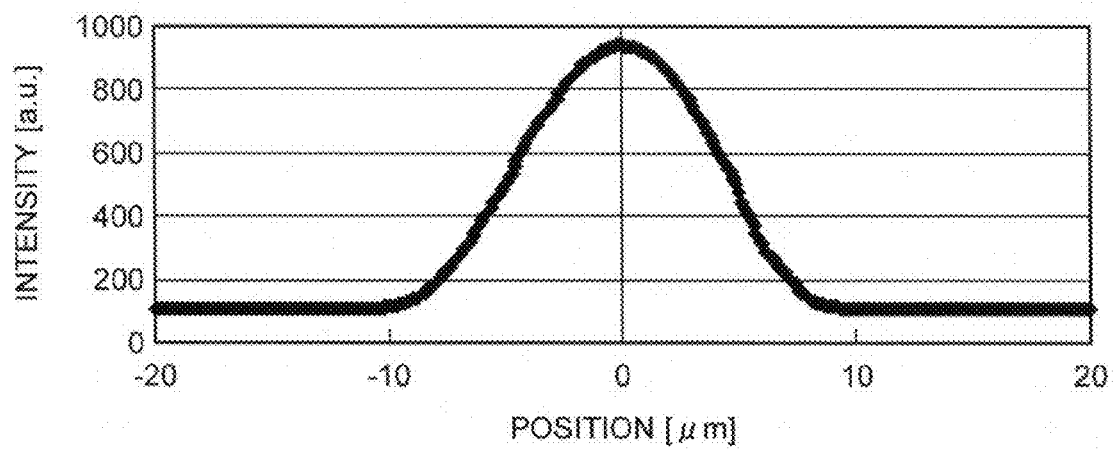
FIG. 16 is a graph of the field distribution of light output from the optical fiber in the example 1 when an offset is set to 0 μm.
Figure 17:
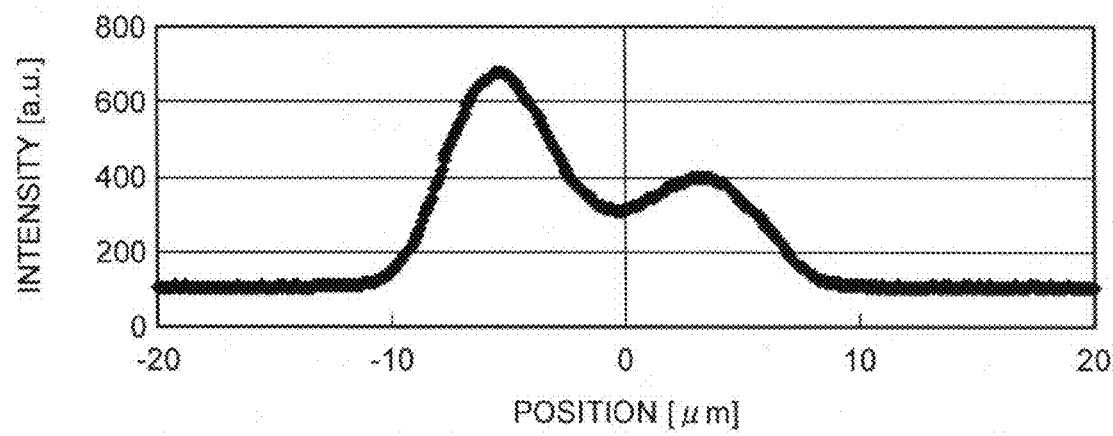
FIG. 17 is a graph of the field distribution of light output from the optical fiber in the example 1 when the offset is set to 5 μm.
Figure 18:
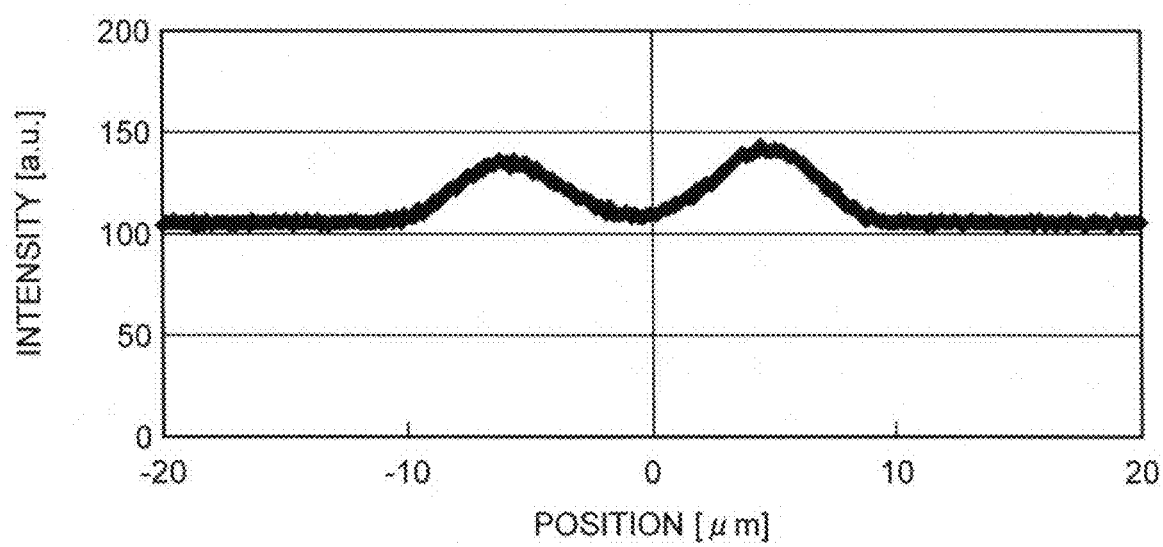
FIG. 18 is a graph of the field distribution of light output from the optical fiber in the example 1 when the offset is set to 9 μm.

FIG. 15 is a table of results of measuring the optical characteristics of the optical fiber in the example 1. FIG. 16 is a graph of the field distribution of light output from the optical fiber in the example 1 when the offset is set to 0 µm. FIG. 17 is a graph of the field distribution of light output from the optical fiber in the example 1 when the offset is set to 5 µm. FIG. 18 is a graph of the field distribution of light output from the optical fiber in the example 1 when the offset is set to 9 µm. In FIG. 16 to FIG. 18, an axis of abscissa indicates a position from the center axis of the core portion, and an axis of ordinate indicates optical intensity in arbitrary units. Furthermore, in the measurement, the length of the optical fiber in the example 1 was set to 2 m.

As the launching optical fiber, a highly-nonlinear optical fiber having a mode field diameter of approximately 4 µm was used. As optical characteristics, a transmission loss, a bending loss, an effective core area (Aeff), polarization mode dispersion (PMD), and chromatic dispersion were measured. The transmission loss and the effective core area were measured using measuring light having a wavelength of 1.55 µm and a wavelength of 1.31 µm. The other optical characteristics were measured using the measuring light having a wavelength of 1.55 µm. Furthermore, FIG. 16 to FIG. 18 illustrate a case that the measuring light having a wavelength of 1.55 µm is used.

As indicated in terms of the shapes of field distribution in FIG. 16 to FIG. 18, when the offset is 0 µm, the LP01 mode having a high intensity field in the vicinity of the center axis of the core portion is mainly excited. Furthermore, when the offset is 9 µm, the LP11 mode and the LP21 mode each having a high intensity field in the periphery of the center axis of the core portion are mainly excited. In addition, when the offset is 5 µm, it is considered that there exists a high possibility that all of the LP01 mode, the LP11 mode, and the LP21 mode are excited. Here, when the offset is 5 µm or 9 µm, it is considered that a mixed mode where higher-order modes are mixed occurs. In this manner, the amount of offset is appropriately set thus exciting a desired propagation mode.

Furthermore, the length of the optical fiber in the example 1 was set to 2.6 km, the measuring light having a wavelength of 1.55 µm (1550 nm) was input in a state where the above-mentioned offset is 9 µm, and the field distribution of the light output after propagation through an overall length of 2.6 km was measured. As a result, the peaks of the field distribution in the LP11 mode and the LP21 mode were observed in the same manner as in the case of FIG. 18. That is, it was confirmed that optical transmission can be performed in three modes using the optical fiber of the example 1.

Here, in the optical fiber 10 according to the present first embodiment, the outside diameter of the cladding portion 12 is set larger than 125 µm and hence, it is also possible to reduce a microbending loss. The microbending loss is defined as an increasing amount of the transmission loss caused by minute bending applied to an optical fiber when lateral pressure is applied to the optical fiber. The outside diameter of the cladding portion 12 is set larger than 125 µm that is the outside diameter of the cladding portion of a general optical fiber and hence, the influence of the lateral pressure upon the confinement of light becomes small thus reducing the microbending loss. Here, when the effective core area is increased, the microbending loss is also increased as well as the bending loss. Therefore, in the optical fiber 10 which is small in bending loss, the microbending loss is reduced in this manner and hence, the limitation of the effective core area caused by the microbending loss is relaxed thus further increasing the effective core area.

Furthermore, in the optical fiber 10, two polarization modes are degenerated in the LP01 mode, and four polarization modes are degenerated respectively in the LP01 mode and the LP21 mode. The above-mentioned calculation is performed by selecting the polarization mode one by one from the two or four degenerated polarization modes respectively. Here, the optical characteristics in the polarization modes degenerated are substantially identical to each other. Therefore, the result of the above-mentioned calculation can be applied to the other polarization modes degenerated and hence, the result of this calculation is used thus realizing an optical fiber suitable for a transmission method using not only mode multiplexing but also polarization-mode multiplexing.

Second Embodiment

Figure 19:
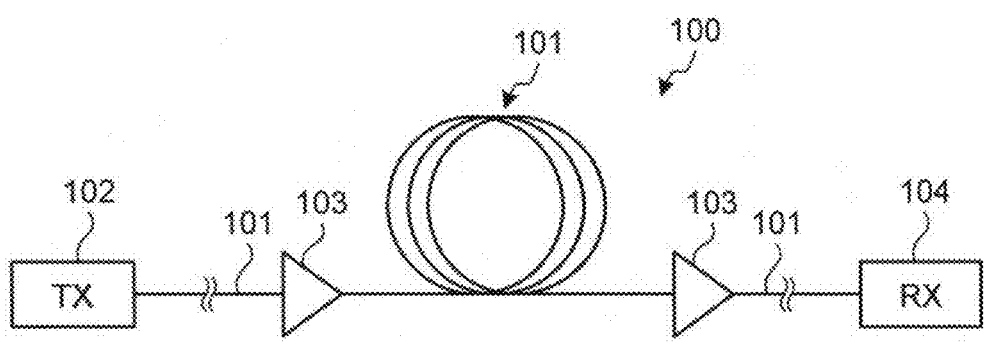
FIG. 19 is a schematic diagram of an optical transmission system according to a second embodiment.

Next, an optical transmission system in a second embodiment of the present invention is explained. FIG. 19 is a schematic diagram of the optical transmission system according to the second embodiment. As illustrated in FIG. 19, the optical transmission system 100 includes an optical fiber 101, an optical transmitter 102, an optical amplifier 103, and an optical receiver 104.

The optical fiber 101 is an optical transmission line that connects the optical transmitter 102 and the optical receiver 104. The optical fiber 101 is, for example, the optical fiber according to the above-mentioned first embodiment, and light in a predetermined wavelength bandwidth propagates therein in a plurality of propagation modes.

The optical transmitter 102 includes a signal light source such as a semiconductor laser element, and outputs signal light for performing signal transmission by using a plurality of propagation modes (the LP01 mode, the LP11 mode, and the LP21 mode, for example) of the optical fiber 101.

The optical amplifier 103 is inserted between the optical fiber 101 and the optical fiber 101. The optical amplifier 103 is constituted such that the signal light propagating in a plurality of propagation modes of the optical fiber 101 can be amplified for each of the propagation modes. Here, the field patterns of light in the respective propagation modes are different from each other. Therefore, the optical amplifier 103 can amplify the signal light in the respective propagation modes separately or simultaneously. It is unnecessary to provide the optical amplifier 103 depending on a transmission distance (the total length of the optical fiber 101 to be used).

The optical receiver 104 includes a plurality of light receiving elements that receive signal light propagating in each propagation mode in the optical fiber 101 and convert the signal light into an electrical signal for each propagation mode, and a signal processing device that processes the electrical signal converted by the light receiving element.

The optical transmission system 100 performs mode division multiplexing transmission of signal light using the optical fiber 101 capable of propagating the signal light in a plurality of propagation modes. Therefore, the optical transmitter 102 and the optical receiver 104 are provided with mode multiplexers/demultiplexers for coupling the signal light with the respective propagation modes or for separating the signal light into the respective propagation modes to receive the signal light for each propagation mode. According to the optical transmission system 100, it is possible to realize an optical transmission system in which transmission capacity is large, and the occurrence of nonlinear optical phenomena and the effect of the bending loss in an optical fiber constituting an optical transmission line are suppressed.

Here, in the above-mentioned embodiments, although the refractive index distribution in the vicinity of the core portion 11 has a W shape, the refractive index distribution of the optical fiber according to the present invention is not limited to the above embodiment, and it is possible to utilize any refractive index distribution such as a single-peaked profile, a step profile, a segment core profile, a trench profile, a W+side core profile, or a ring-shaped profile.

Furthermore, in the above-mentioned embodiment, although the cladding portion is made of pure silica glass, the center core portion may, for example, be made of pure silica glass, and the outer core portion and the cladding portion may be made of silica glass containing dopant for lowering the refractive index. In addition, in the above-mentioned embodiments, although the optical fiber is made of a silica glass material, the material of the optical fiber according to the present invention is not limited to above, and it is possible to utilize optionally optical materials such as the other glass materials or plastic materials being able to compose the optical fiber.

That is, at a wavelength of 1550 nm, an optical fiber whose effective core area in the fundamental propagation mode is 120 $\mu m^2$ or larger, effective core area in the first higher-order propagation mode is 150 $\mu m^2$ or larger, effective core area in the second higher-order propagation mode is 180 $\mu m^2$ or larger and effective refractive index is larger than the refractive index of the cladding portion by 0.0002 or more, and effective refractive index in the third higher-order propagation mode is less than the refractive index of the cladding portion is used thus achieving the advantageous effect of the present invention irrespective of the refractive index profile or the material.

Furthermore, as the wavelength of signal light to be transmitted in the optical fiber according to the present invention, a wavelength range including 1550 nm or a desired wavelength range used for optical fiber communication can be used.

In addition, the present invention is not limited to the above-mentioned embodiments. The present invention includes a case of constituting the above-mentioned respective constitutional features arbitrarily by combining with each other. In addition, additional effects or modifications can easily be contemplated by those skilled in the art. Therefore, the more extensive aspect of the present invention is not limited to the above-mentioned embodiments, and various modifications can be made.

As mentioned above, the optical fiber according to the present invention is suitable for the use in an optical communication field.

According to some embodiments, it is possible to realize an optical fiber in which an effective core area is large and a bending loss is small in each propagation mode.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber comprising:
a core portion; and
a cladding portion that is formed around an outer periphery of the core portion and has a refractive index lower than a maximum refractive index of the core portion, wherein
as characteristics of the optical fiber at a wavelength of 1550 nm, an effective core area in a fundamental propagation mode is 120 $\mu m^2$ or larger, an effective core area in a first higher-order propagation mode is 150 $\mu m^2$ or larger, an effective core area in a second higher-order propagation mode is 180 $\mu m^2$ or larger, an effective refractive index in the second higher-order propagation mode is larger than the refractive index of the cladding portion by 0.0002 or more, and an effective refractive index in a third higher-order propagation mode is less than the refractive index of the cladding portion;
wherein the core portion includes a center core portion having the maximum refractive index and an outer core portion that is formed around an outer periphery of the center core portion and has a refractive index lower than the refractive index of the cladding portion;
wherein a relative refractive-index difference $\Delta 1$ of the center core portion relative to the cladding portion is 0.36% or more, a relative refractive-index difference $\Delta 2$ of the outer core portion relative to the cladding portion is −0.05% or less, a diameter of the center core portion is 14.90 $\mu m$ to 17.30 $\mu m$, and a ratio of an outside diameter of the outer core portion to the diameter of the center core portion is 2.0 or more.

2. The optical fiber according to claim 1, wherein the effective refractive index in the second higher-order propagation mode is larger than the refractive index of the cladding portion by 0.0005 or more.

3. The optical fiber according to claim 1, wherein the first higher-order propagation mode is an LP11 mode.

4. The optical fiber according to claim 1, wherein the second higher-order propagation mode is an LP21 mode.

5. The optical fiber according to claim 1, wherein the third higher-order propagation mode is an LP02 mode.

6. The optical fiber according to claim 1, wherein the relative refractive-index difference $\Delta 1$ is 0.41% or more.

7. The optical fiber according to claim 1, wherein the relative refractive-index difference $\Delta 1$ is 0.48% or less.

8. The optical fiber according to claim 1, wherein an outside diameter of the cladding portion is larger than 125 $\mu m$.

9. An optical transmission system comprising the optical fiber according to claim 1.

* * * * *